Patented Feb. 13, 1923.

1,445,168

UNITED STATES PATENT OFFICE.

HERMANN PLAUSON, OF HAMBURG, GERMANY.

PROCESS FOR THE MANUFACTURING OF VINYL HALIDES.

No Drawing. Application filed February 12, 1921. Serial No. 444,496.

*To all whom it may concern:*

Be it known that I, HERMANN PLAUSON, Esthonian subject, residing at Hamburg, Germany, have invented certain new and useful Improvements in a Process for the Manufacture of Vinyl Halides (for which I have made application in Germany Sept. 9, 1918), of which the following is a specification.

It is known that vinyl chlorides can be made by passing acetylene into hot aqueous hydrochloric acid in presence of solid, dissolved or suspended mercury compounds or from acetylene and hydrochloric acid gas.

According to the present invention, vinyl halides are prepared by the use of calcium carbide as a reagent. Berthelot made the observation that an excess of hydrochloric acid reacted upon copper acetylide to form acetylene which was contaminated with vinyl chloride (Ann. D. Chemie, vol. 132, page 123).

But it is not possible to prepare chlorinated vinyl compounds in this manner with a practicable yield.

It has been found that on the contrary that by using calcium carbide as hereafter described, excellent results can be obtained.

If concentrated halogen hydrides are allowed to interact on calcium carbide in presence of catalysts and with heating, the first formed acetylene gas is found to add on to the halogen hydride so that vinyl halides can be formed quantitatively under suitable conditions.

It has further been demonstrated that this reaction takes place without catalysts if the pressure is raised above atmospheric pressure. The yield of vinyl halides is higher in presence of mercury and/or copper compounds.

The main feature of the present invention is therefore the use of calcium carbide as the starting point. This eliminates the costly apparatus necessary for the manufacture of acetylene and also the tedious purification of the crude acetylene so that very substantial technical advantages are obtained.

It was of course well known that acetylene gas was formed by the action of halogen hydrides on calcium carbide but it could not have been foreseen that vinyl halide would be produced in good yield in presence of a catalyst because according to the processes hitherto employed, the acetylene gas was very carefully purified from all impurities which were considered to interfere with the reaction. It was remarkable therefore that calcium carbide itself would be employed and this is apparently possible because of a neutralization of the injurious effects of the impurities by the simultaneous presence of soluble calcium salts which are formed during the process by solution of the calcium hydroxide in the halogen hydride. The presence of the calcium compounds appears to favour the reaction favourably.

The process is illustrated by the following example.

*Example.*

Concentrated hydrochloric acid (25–30%) is supplied to an acid-resistant vessel which may be of silicon-iron alloy, preferably provided with a stirring apparatus. About 5% of the ethylene chlor-sulphonic acid salt of mercury is added as a catalyst and calcium carbide is then added in portions at a temperature of 60-95° C. The concentrated hydrochloric acid at once reacts with the calcium carbide and the acetylene gas thus liberated interacts with the hydrochloric acid, in the moment of its formation, giving mainly vinyl chloride but also a small quantity of ethylidene dichloride and chlor substitution products of acetaldehyde. The vinyl chloride distils off from the reaction vessel at the temperature of operation and it is obtained in a yield of 80-90% by known methods such as condensation by cooling or absorption. It is obtained pure by rectification.

The reaction vessel can also be connected with a vacuum pump and the vinyl chloride continuously sucked off.

If a stream of hydrochloric acid gas is passed through the reaction liquid during the process, the yield of the dichlor-aldehyde compound is reduced and the yield of vinyl chloride is almost quantitative. The reaction can also be performed under pressure. In this case more ethylidene dichloride is obtained and the vinyl chloride is obtained partially in the polymerized state.

The reaction residue can be employed as calcium chloride. Instead of the mercury salts alone, a mixture of mercury and copper compound, e. g. mercuric chloride and cupric chloride can be added as catalyst.

Small quantities of zinc, aluminum and/or tin chloride accelerate the addition of hydrochloric acid gas to the nascent acetylene and indeed in the direction of formation of vinyl chloride, but ferric chloride accelerates the reaction in the direction of formation of dichlor-acetaldehyde. Other vinyl halides can be made in the same manner as vinyl chloride.

Instead of aqueous hydrochloric acid, it is possible to use solutions of hydrochloric acid in organic solvents such as hydrocarbons, etc.

The vinyl halides prepared according to the above described process are used for the preparation of technically valuable bodies.

According to my process, the halogen hydride reacts with acetylene to form a vinyl halide, this action being in effect to produce a product in which all the elements of the two reacting compounds are united in a single compound. The reaction is essentially that of a halogen hydride on acetylene, as distinguished from a complex reaction in which an oxidizing agent is present to give free halogen.

Having now particularly described and ascertained the nature of my said invention and in what manner the same is to be performed, I declare that what I claim is:—

1. Process for the manufacture of a vinyl halide which consists essentially in treating calcium carbide with a halogen hydride, in substantial absence of an oxidizing agent.

2. Process for the manufacture of a vinyl halide which consists essentially in treating calcium carbide with a solution of a halogen hydride in substantial absence of an oxidizing agent.

3. Process for the manufacture of a vinyl halide which consists essentially in treating calcium carbide with an aqueous solution of a halogen hydride.

4. Process for the manufacture of a vinyl halide which consists essentially in treating calcium carbide with a halogen hydride in presence of a catalyst in substantial absence of an oxidizing agent.

5. Process for the manufacture of a vinyl halide which consists essentially in treating calcium carbide with a halogen hydride in presence of a mercury salt.

6. Process for the manufacture of a vinyl halide which consists essentially in treating calcium carbide with a halogen hydride in presence of a mercury salt and a copper salt in substantial absence of an oxidizing agent.

7. The process for the manufacture of a vinyl halide which consists essentially in treating calcium carbide with a halogen hydride under pressure.

8. Process for the manufacture of vinyl chloride which consists essentially in treating calcium carbide with hydrochloric acid in substantial absence of an oxidizing agent.

9. Process of preparing a vinyl halide which consists essentially in causing halogen hydride to interact with nascent acetylene in substantial absence of an oxidizing agent.

10. The process for the manufacture of vinyl chloride which consists essentially in causing hydrochloric acid to interact with nascent acetylene in substantial absence of an oxidizing agent.

In witness whereof, I have hereunto signed my name this 30 day of Decr. 1920, in the presence of two subscribing witnesses.

HERMANN PLAUSON.

Witnesses:
J. VICTOR ARMSTRONG,
W. H. BEERTON.